F. S. HAYNES.
POWER DRIVEN CLUTCH FOR BELTS, &c.
APPLICATION FILED JUNE 6, 1919.

1,323,362.

Patented Dec. 2, 1919.
3 SHEETS—SHEET 1.

Inventor
Frank S Haynes
By
his Attorneys

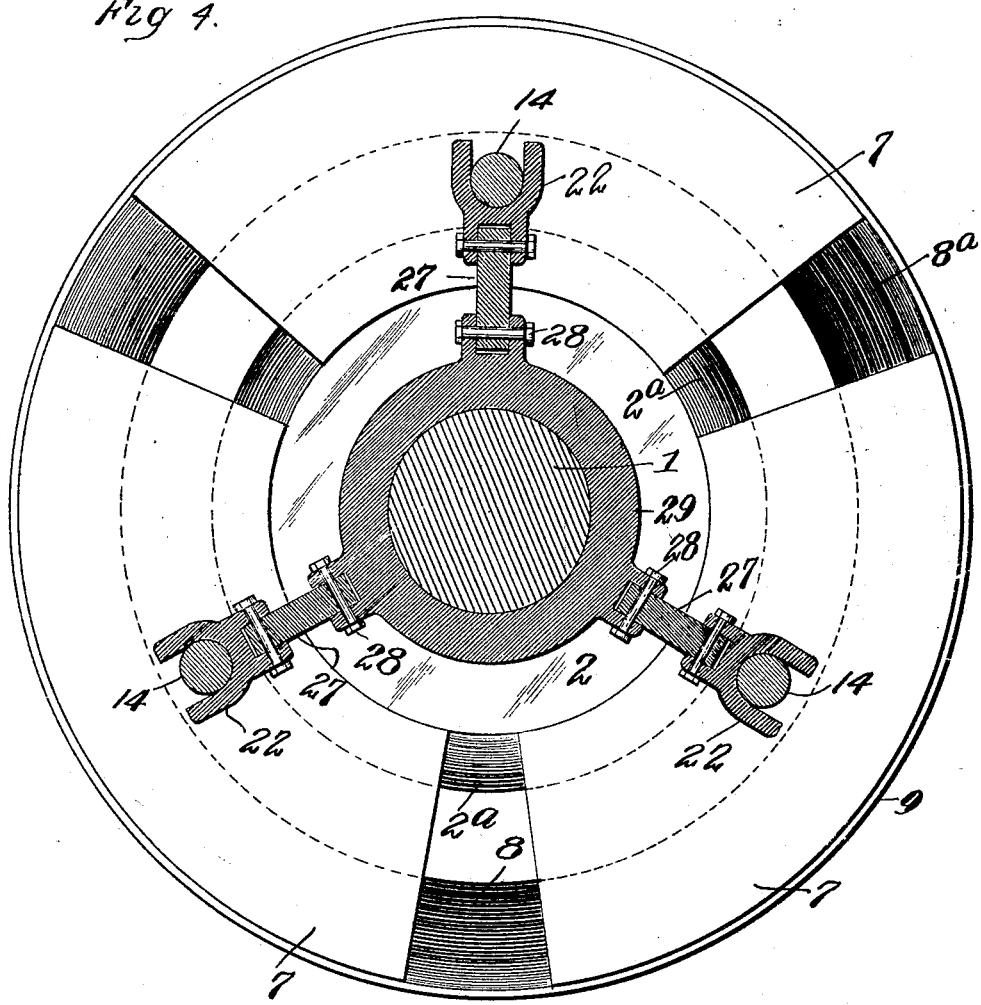
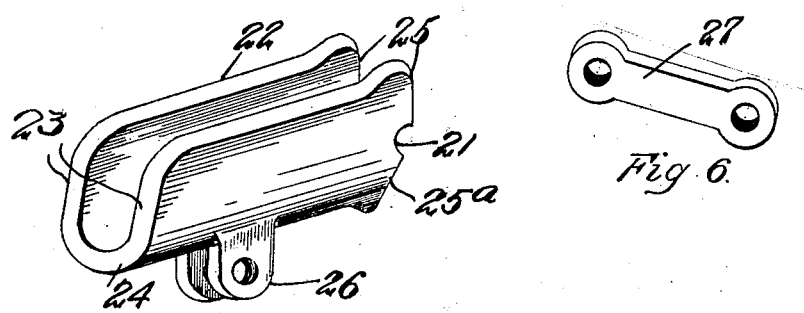

UNITED STATES PATENT OFFICE.

FRANK S. HAYNES, OF ROBINSON, ILLINOIS.

POWER-DRIVEN CLUTCH FOR BELTS, &c.

1,323,362. Specification of Letters Patent. Patented Dec. 2, 1919.

Application filed June 6, 1919. Serial No. 302,112.

*To all whom it may concern:*

Be it known that I, FRANK S. HAYNES, a citizen of the United States, residing at Robinson, in the county of Crawford and State of Illinois, have invented certain new and useful Improvements in Power-Driven Clutches for Belts, &c., of which the following is a specification, reference being had therein to the accompanying drawings.

This invention relates to a power driven clutch for belts, and the like, and has for its object the construction of an efficient and comparatively simple clutch that is positive in operation.

Another object of the invention is the construction of a clutch which can be easily lubricated or greased and also readily repaired when needed.

With these and other objects in view, my invention comprises certain novel constructions, combinations, and arrangements of parts as will be hereinafter specifically described, illustrated in the accompanying drawings, and more particularly pointed out in the appended claims.

In the drawings,

Fig. 4 is a section taken on line 4—4, Fig. 1, looking in the direction of the arrows.

Fig. 5 is a perspective view of one of the eccentric dogs.

Fig. 6 is a perspective view of one of the links.

Figure 1:
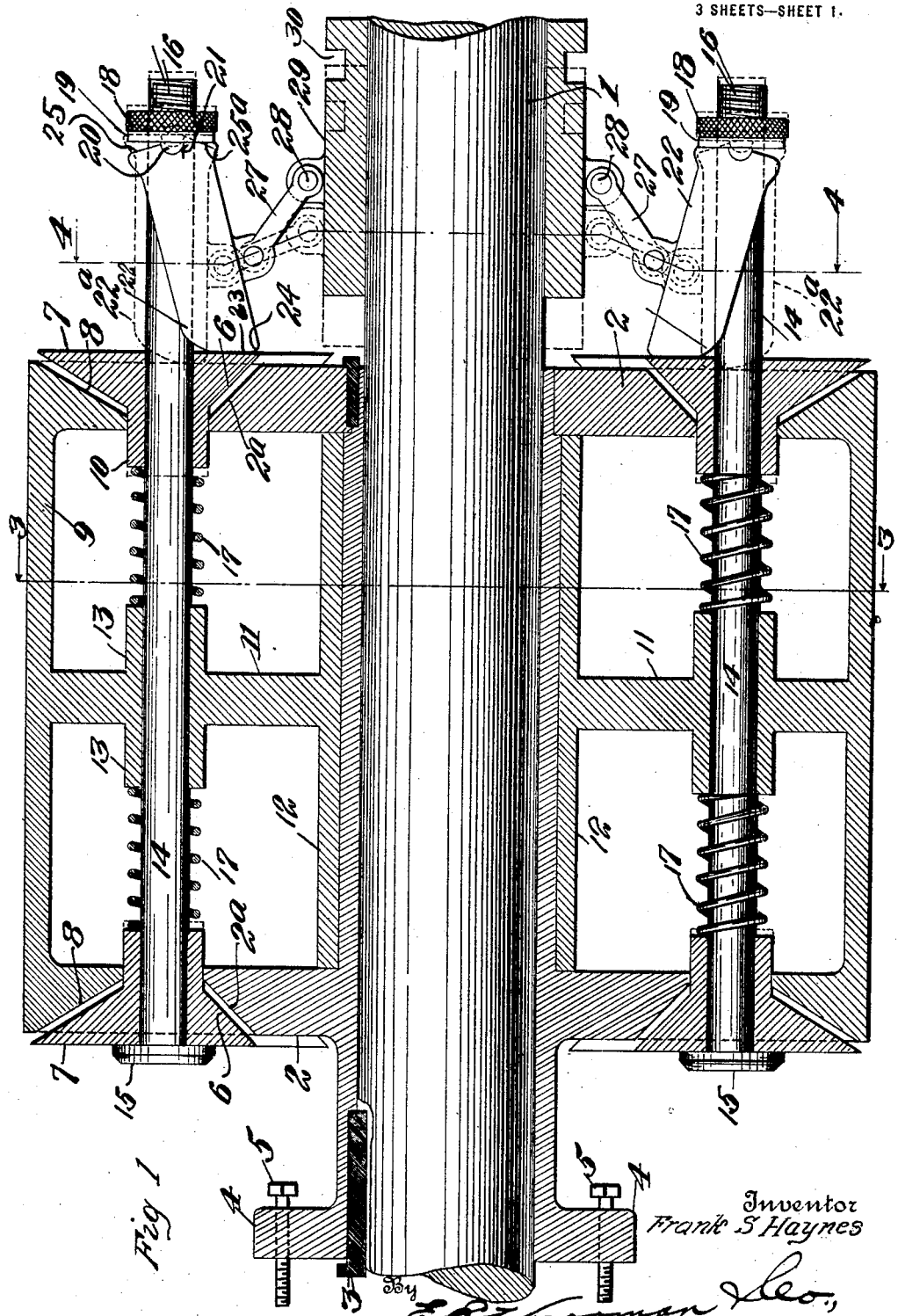
Figure 1 is a longitudinal, sectional view of my improved clutch.
Figure 3:
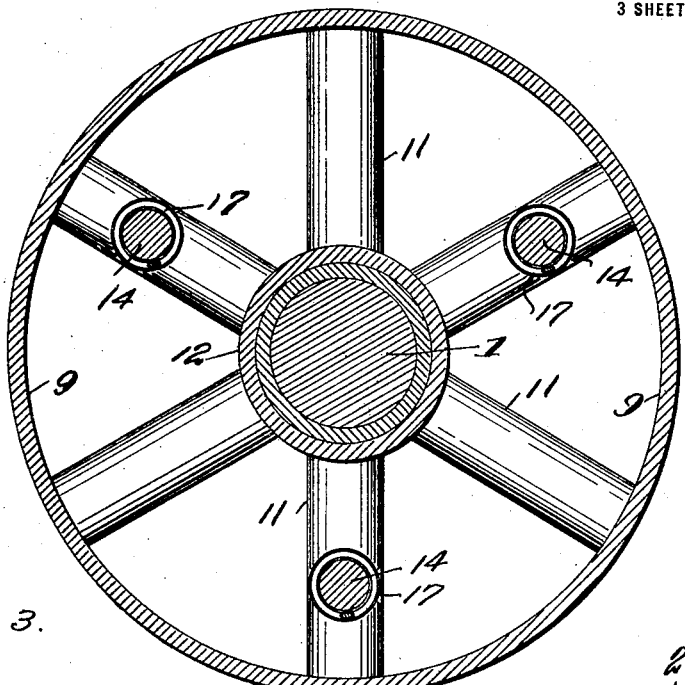
Fig. 3 is a section taken on line 3—3, Fig. 1, looking in the direction of the arrows.

Referring to the drawings, by numerals, 1 designates the driving shaft upon which is mounted the driving hub 2; the hub 2 is fastened by key 3 to shaft 1. The hub 2 is provided with an integral flange 4, which flange 4 carries suitable fastening means, as bolts 5, whereby the flange may be connected to a fly wheel or like member mounted upon the shaft 1. The hub 2 is provided with outer, annular, beveled edges $2^a$ which are adapted to be engaged by the inner, beveled edges 6 of the friction plates 7.

I preferably show three friction plates 7 used in the construction of my improved clutch, although any number may be used without departing from the spirit or scope of the present invention. Each plate is provided with an outer, beveled edge $6^a$, which is adapted to engage the beveled face or edge 8 of the friction pulley 9. Each friction plate 7 is provided with an inwardly-extending, integral sleeve 10.

The friction pulley 9 is provided with integral spokes 11 and with an annular sleeve 12, which sleeve surrounds a portion of the hub 2 (Fig. 1) and is loosely mounted thereon so that the pulley will be idle upon the hub until the friction plates 7 are closed tightly upon the beveled edges or faces $2^a$ and 8 of the hub 2 and pulley 9, respectively. Upon each spoke 11 is a pair of hub-like extensions 13, and these extensions 13, together with sleeves 10 of the friction plates, are formed in alinement and through each set (Fig. 1) of the hub-like extensions 13 and the sleeves of each alined friction plate, extends a drawbolt 14. Each drawbolt is provided at one end with a head 15 and is screwthreaded at its opposite end 16 (Fig. 1). On each drawbolt 14 is mounted a pair of coil springs 17; each spring is positioned between the outer end of a hub-like extension 13 and the inner end of a sleeve on one of the friction plates 7, whereby the friction plates are normally held out of operative engagement with the hub 2 and the pulley 9 (Fig. 1).

Figure 7:
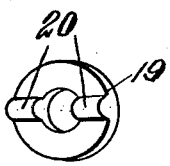
Fig. 7 is a perspective view of one of the washers.
Figure 2:
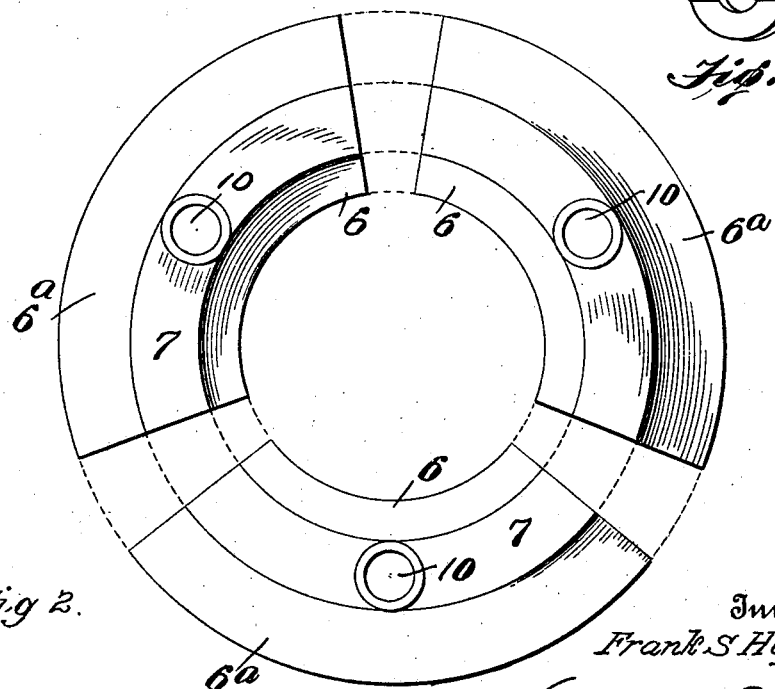
Fig. 2 is a view in elevation of the friction plates of the clutch.

Upon the threaded end 16 of each drawbolt 14 is mounted a nut 18, and loosely positioned in front of nut 18 is a washer 19 (Fig. 7). The washer 19 is provided with alined, rounded lugs 20 upon its inner face, and these lugs 20 fit in the curved notches 21 formed in the outer end of the eccentric dog 22 (Fig. 5). Each eccentric dog comprises a substantially U-shaped body so that the dog can straddle the drawbolt 14, with the notches 21 seated upon the lugs 20 of the washer 19. When the dogs are in their normal position as shown in Fig. 1, the straight edges 23, on the inner end of the dog, will rest flat against the outer face of the friction plate 7. Of course, the same structure is duplicated in all of the dog structures, and, therefore, it will be necessary to describe only one of the eccentric dogs and how it operates. When the dog is in its set position as shown by dotted lines $22^a$ (Fig. 1), the rounded edge 24 will be engaging the outer face of the friction plate, while the straight flat edges 25, at the outer end of the dog, will bear against the flat inner face of washer 19 (Fig. 1), thereby locking the friction plates in their set position upon the hub 2 and the friction pulley 9, but as soon as the dogs are moved to their inoperative position, shown in full lines in Fig. 1, the straight edge 25ᵃ, formed at the outer end of the dog, will engage the outer face of the washer, and the flat straight edges 23 will be resting against the outer face of the friction plate. These peculiar edges on the ends of the dog make my clutch very positive in action by holding the dogs in their set or unset position after they have been moved to either of these positions through the will of the operator.

Each eccentric dog is provided with inwardly-extending parallel apertured lugs 26, and between each pair is positioned link 27, and suitable fastening means extend through an end of the link and each pair of lugs, pivotally connecting the link to the dog 22. The inner end of each link is pivotally connected at 28 to the loosely mounted sliding sleeve 29, which sleeve 29 is provided with an annular channel or groove 30 for receiving an ordinary lever, whereby the sleeve is adjusted longitudinally of the driving shaft 1 for actuating the eccentric dogs and thereby operating the friction plates or "shoes" for controlling the drive of the friction pulley 9. In operation, when the eccentric dogs are in their normal position shown in Fig. 1, all the operator has to do is to force sleeve 29 inwardly, causing the dogs to be pushed into a parallel position with the drawbolts 14, and thereby forcing the freely mounted plates 7 against the beveled faces 2ᵃ and 8, causing the friction pulley to be locked upon the hub 2, whereby the pulley will be driven by the driving shaft 1; it will be understood that when the dogs are forced to their straddling or set position upon the drawbolts, the drawbolts will be "pulled" through the spokes, pulling or drawing the friction plates that are on the drawbolts against the heads 15 into engagement with the hub and the pulley; at the same time the friction plates engaged by the dogs will be forced inwardly, the dogs performing the function of causing the outer friction plates carried against the heads of the bolts to be drawn into frictional engagement with the pulley. Upon the operator sliding sleeve 29 outwardly, pulling the dogs to their inoperative position, shown in full lines in Fig. 1, the springs 27 will force the friction plates outwardly upon the drawbolts, thereby disengaging the friction pulley 29, and permitting the same to be idle upon the hub 2 that is keyed to the driving shaft 1.

The drawbolts are of a simple structure, and can be readily secured on the market, thereby facilitating the repairing of the clutch when needed, by making it easy to secure the necessary parts of my clutch, and owing to the simplicity of the entire structure, the clutch is easy to lubricate or grease, and by reason of its compactness, it is efficient in operation.

Certain minor changes or alterations may be found necessary in the construction or manufacture of my clutch on a large scale, and I reserve the right to make such alterations or changes as shall appear to one skilled in the art to which this invention relates, and which fairly fall within the scope of the appended claims.

What I claim is:

1. In a clutch mechanism of the class described, the combination with a driving shaft, a hub provided with sides having beveled edges keyed to said shaft, of a friction pulley provided with spokes and with an integral sleeve at the inner ends of said spokes, said sleeve surrounding the hub and filling the space between the sides thereof, each spoke provided with extensions, bolts extending through the extensions of the spokes, friction plates mounted upon the bolts, and means for operating the friction plates to cause the same to engage the beveled faces of the sides of the hub and portions of the pulley for locking the pulley against independent movement upon the hub and driving shaft.

2. In a clutch mechanism of the class described, the combination with a driving shaft, a hub secured to said driving shaft, of a pulley mounted upon said hub, said pulley provided with spokes, each spoke provided with oppositely-extending hub-like extensions, drawbolts extending through the oppositely-extending extensions of the spokes, friction plates provided with inwardly-extending sleeves mounted upon the drawbolts, coil springs between the inner ends of the sleeves and the hub-like extensions of the spokes, for holding the friction plates in an inoperative position, and means for moving the friction plates on the drawbolts into engagement with the hub and pulley for locking the pulley against independent movement with respect to the hub and driving shaft.

3. In a clutch mechanism of the class described, the combination with a driving shaft, a hub secured to the driving shaft, of a pulley mounted upon said hub, drawbolts extending through portions of the pulley, friction plates on said drawbolts and adapted to engage said hub and pulley, nuts on said drawbolts, a washer on each drawbolt and engaging the nut, a sleeve on said driving shaft, and means connected to the sleeve and partly supported upon the washer and adapted to operate upon some of the friction plates for sliding some of the friction plates upon the drawbolts, drawing the other friction plates toward the pulley for clamping or holding all of the friction plates tightly in engagement with the hub and the pulley.

4. In a clutch mechanism of the class described, the combination with a driving shaft, a hub secured to said driving shaft, of a pulley mounted upon said hub, drawbolts carried by said pulley, friction plates on said drawbolts adapted to engage the hub and the pulley, U-shaped eccentric dogs straddling said drawbolts, means supporting said dogs upon said drawbolts, and means for operating said dogs for causing the same to press upon some of the friction plates, thereby causing all of the friction plates to be locked upon the pulley and the hub.

5. In a clutch mechanism of the class described, the combination with a driving shaft, a hub secured to said driving shaft, of a pulley mounted upon said hub, drawbolts carried by said pulley, nuts on said drawbolts, a washer provided with rounded lugs on said drawbolts and resting against said nuts, eccentric dogs provided with recesses receiving said lugs of the washers, and means for moving said dogs upon said washer and drawbolts for causing the friction plates to clamp or be locked upon the hub and pulley.

6. In a clutch mechanism of the class described, the combination with a driving shaft, a hub secured to said driving shaft, of a pulley loosely mounted upon said hub, drawbolts carried by said pulley, said drawbolts provided with nuts near one of their ends, washers loosely mounted upon said drawbolts and resting against the inner faces of the nuts, each washer provided with alined lugs, eccentric dogs straddling the bolts and supported at their outer ends upon said lugs of the washers, and means operating said dogs for moving the same from an unset position to a set position, thereby causing the friction plates to be clamped or locked upon the hub and pulley.

7. In a clutch mechanism of the class described, the combination with a driving shaft, a hub secured to said driving shaft, of a pulley mounted upon said hub, drawbolts extending through portions of the pulley, said drawbolts provided with threaded ends, nuts upon said threaded ends, washers having rounded lugs upon the drawbolts and engaging said nuts, U-shaped eccentric dogs straddling the drawbolts and provided at their outer ends with recesses receiving the lugs of the washers, each dog provided with parallel, apertured lugs, and means connected to said parallel, apertured lugs for operating the dogs for moving the same from an unset to a set position, or vice versa.

8. In a clutch mechanism of the class described, the combination with a driving shaft, a hub secured to said driving shaft, of a pulley upon said hub, drawbolts carried by said pulley, friction plates upon said drawbolts, washers upon said drawbolts and engaging said nuts, eccentric dogs positioned between the washers and some of said friction plates, each eccentric dog provided with straight, inner edges and with rounded, inner corners, each dog also provided with sets of straight, outer edges formed in different vertical planes, said edges being adapted to retain the eccentric dog in an unset or set position, and means for actuating said dogs for causing said edges to be moved to different positions, substantially as shown and described.

9. In a clutch mechanism of the class described, the combination with a driving shaft, a hub secured to said shaft, of a pulley mounted upon said hub, said pulley provided with drawbolts, friction plates on said drawbolts at opposite ends of said pulley, washers on said drawbolts, means carried by the drawbolts for holding the washers in position, U-shaped eccentric dogs straddling the drawbolts and engaging at one end said washers and at their other ends some of said friction plates, and each dog provided at each end with differently-constructed edges for engagement with the contiguous coöperating parts when the dog is in different adjusted positions.

10. In a clutch mechanism of the class described, the combination with a driving shaft, a hub secured to said driving shaft, of a friction pulley mounted upon said hub, drawbolts extending through said pulley, friction plates upon said drawbolts at opposite ends of the pulley, each drawbolt being threaded at one end, a nut upon said threaded end, a loose washer upon said drawbolt and resting against said nut, said washer provided with alined, rounded lugs, a U-shaped eccentric dog straddling each drawbolt, said dog provided at its outer end with alined, curved notches receiving the alined lugs of the washer, each dog provided with inwardly-extending lugs, and means connected to said inwardly-extending lugs for operating the dog for moving the same to a set position, whereby a friction plate on the bolt supporting the dog will be forced inwardly against the hub and pulley, and another friction plate carried by the same bolt will be drawn inwardly into engagement with the hub and pulley, substantially as shown and described.

In testimony whereof I hereunto affix my signature.

FRANK S. HAYNES.